United States Patent
Nichols

(10) Patent No.: US 7,082,270 B2
(45) Date of Patent: Jul. 25, 2006

(54) MACHINE OPTIMIZATION METHODOLOGY

(75) Inventor: Stephen J. Nichols, Walworth, NY (US)

(73) Assignee: Xerox Corporation, Stamford, CT (US)

(*) Notice: Subject to any disclaimer, the term of this patent is extended or adjusted under 35 U.S.C. 154(b) by 995 days.

(21) Appl. No.: 09/967,506

(22) Filed: Oct. 1, 2001

(65) Prior Publication Data

US 2003/0063308 A1 Apr. 3, 2003

(51) Int. Cl.
*G03G 15/00* (2006.01)

(52) U.S. Cl. ............................................. 399/10; 299/8
(58) Field of Classification Search ............... 399/10, 399/8
See application file for complete search history.

(56) References Cited

U.S. PATENT DOCUMENTS

| | | | |
|---|---|---|---|
| 4,125,874 A * | 11/1978 | Higashide et al. | |
| 5,589,878 A * | 12/1996 | Cortjens et al. | |
| 5,884,118 A | 3/1999 | Mestha et al. | 399/15 |
| 6,108,099 A * | 8/2000 | Ohtani | |
| 6,130,760 A | 10/2000 | Nickerson | |
| 6,587,647 B1 * | 7/2003 | Watanabe et al. | 399/8 |

* cited by examiner

*Primary Examiner*—Susan Lee
(74) *Attorney, Agent, or Firm*—Christopher D. Wait

(57) ABSTRACT

The present invention relates to the remote activation of a system diagnostic for a customer. The system so activated is resident at the customer location. The activation is initiated at a location remote from the customer location. The activation of the diagnostic may also include correction and optimization of the system if it is determined that it is needed. Any such initiated system activity would most typically be performed after hours. The system then communicates locally to the customer the diagnostic results as found, as well as any other action taken.

22 Claims, 2 Drawing Sheets

MACHINE OPTIMIZATION METHODOLOGY

BACKGROUND OF THE INVENTION AND MATERIAL DISCLOSURE STATEMENT

The present invention relates generally to the remote activation of a system diagnostic for a customer. The invention relates more particularly to the activation of a system diagnostic which may also include correction and optimization as needed, wherein such activity would most typically be performed after normal work-day hours.

As large systems, both electrical systems but more particularly electro-mechanical systems, have become more complex there has been an ever increasing incidence of support problems for those systems. With these systems being installed at customer sites, system breakdowns and repair support are considered disruptive to the customers business. As a result, many such complex systems are being provided with self diagnostic capabilities. The initiation of such diagnostics may be from interaction with the customer, by a service representative, a remote actualization, or even as automatically scheduled and provided within the system. Of course, there is a necessity of cost associated with the development, deployment and initiation of such diagnostics. A cost which ultimately is born by the customer. However, some customers may balk at such costs. One approach is to offer such diagnostics as optional, though at additional cost to a customer. As such diagnostics are disruptive, the best arrangement is to schedule them in the evening outside of typical user operating hours. However, there can be a conundrum for the most successful machines which may seldom require outside service particularly in situations where automated diagnostics with self-repair or self-alignment capability are involved. That conundrum is a fear on the part of the customer of paying for a service which is not received or not even actually needed. The better and more successful the diagnostic and machine design the greater the likelihood of this perception by the customer.

The following patents are considered relevant background art: U.S. Pat. No. 6,108,099 to Ohtani, wherein an image forming apparatus includes, a network interface for connecting the image forming apparatus to a network as a network terminal, an electronic mail communication control unit for communicating an electronic mail with another network terminal through said network interface, a memory for storing an address of a predetermined network terminal, a sensor for detecting an abnormal condition of the image forming apparatus, a controller for producing the electronic mail according to the address stored in the memory, and wherein the electronic mail communication control unit sends an electronic mail produced by the controller to the predetermined network terminal when the sensor detects an abnormal condition such as when the sensor detects a paper jam, toner empty and paper-out.

U.S. Pat. No. 6,130,760 to Nickerson, wherein a transmission job originating station for controlling transmission of job information, based on the processing of a print job in a printing system, is provided. The control system includes a document generating subsystem for providing at least a portion of the print job to be delivered to a print machine and a user interface for programming a set of information including one or more confirmation destinations with each confirmation destination being disposed remotely of the transmission job originating station. The transmission job originating station further includes a control subsystem which, in response to the processing of at least a portion of the print job at the printing machine, reads the set of information and determines each confirmation destination, programmed with the user interface, to which the job information is to be transmitted.

The above noted patents are herein incorporated by reference in their entirety for their teaching.

Therefore, as discussed above, there exists a need for a design arrangement which will solve the problem of improving customer perception and also allowing for greater opportunity for human interaction or intervention with automated diagnostics in the customer environment. Thus, it would be desirable to solve this and other deficiencies and disadvantages as discussed above with an improved automated diagnostic methodology.

SUMMARY OF THE INVENTION

The present invention relates to a method for after hours system diagnosis comprising initiating a system optimization followed by generating a status report of the results of the system optimization, and sending the generated report from the system.

More particularly, the present invention relates to an improved method for after hours system diagnosis comprising initiating a system diagnostic remotely which yields results. This is followed by generating a status report of the results of the system diagnostic and sending locally from the system the generated status report.

In particular, the present invention relates to a method for after hours system diagnosis comprising initiating an after hours system diagnostic remotely and comparing the system diagnostic results to a normal operating range. This is followed by initiating a system self optimization if the results of the compare step so dictate. If the self optimization is initiated then a second system diagnostic is initiated to determine the success of the self optimization. The next step is generating a status report of the results of the system diagnostic, the initiation of any self optimization and the result of any second system diagnostic and then sending the generated status report from the system.

DESCRIPTION OF THE INVENTION

Figure 1:
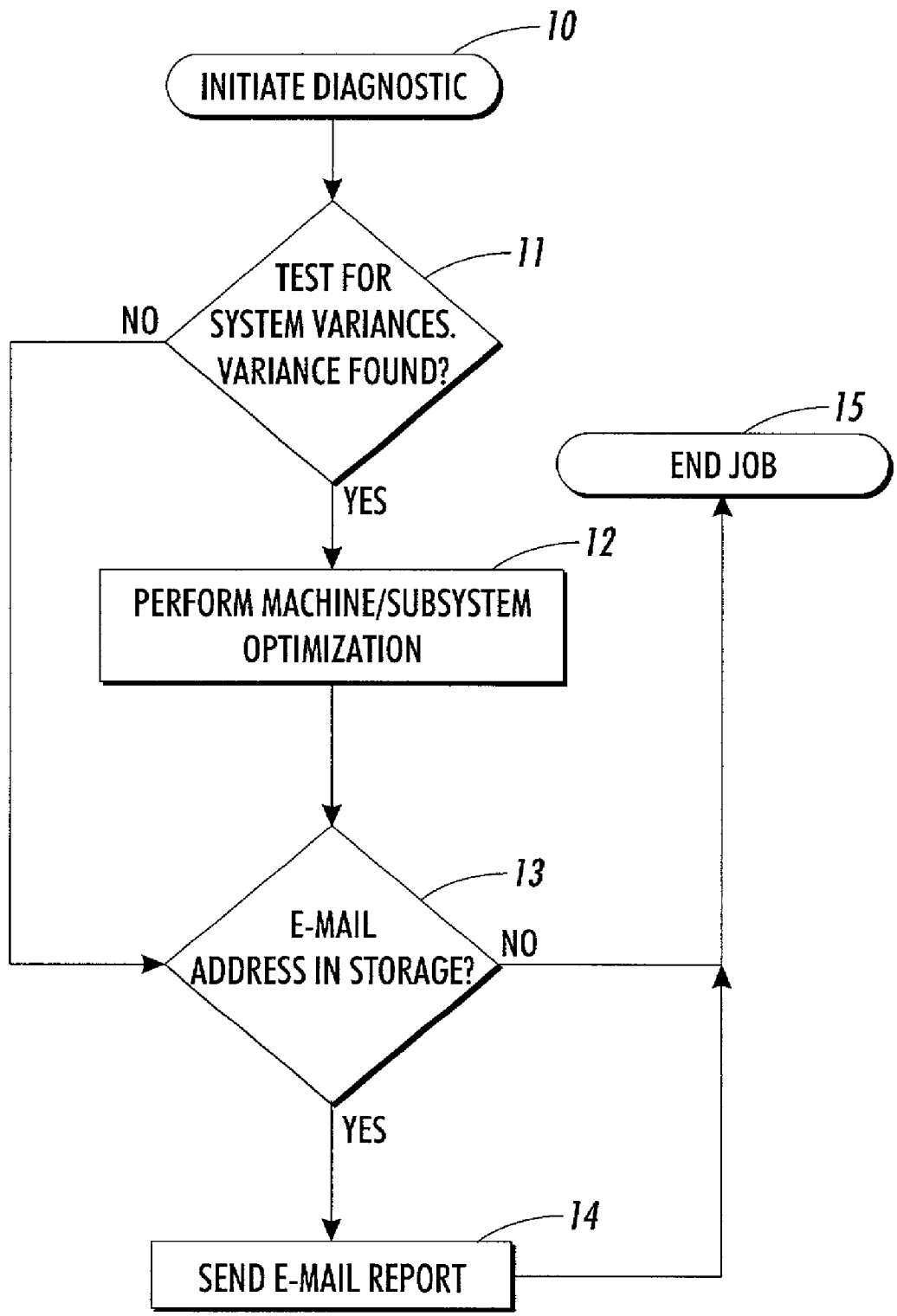
FIG. 1 depicts a flow chart showing the logical operation for one embodiment of the present invention.

FIG. 1 depicts a flow chart showing the logical operation for one embodiment of the present invention. In initiation diagnostic block 10, a diagnostic is started. In one embodiment this is done from a location remote from the customer system site. This is most typically from the service providers location. However, it in the alternative it may also be initiated via a software timer situated in the system which is also set remotely from the service providers location. In decision block 11, a test for system variances is performed and the decision block determines whether an actual variance has been found. If no variance is actually found, and the answer is "no", then the next step is to proceed to decision block 13 for a test for whether an e-mail address is to be found in storage. However, if in block 11 a variance is found, then in one preferred embodiment, we proceed to perform a machine or a machine subsystem optimization as denoted in block 12. The next step is to then proceed to decision block 13 and check for an e-mail address in storage. If such an e-mail address is found, the next step is to proceed to block 14, to generate and send an e-mail report to the customer residing electronically at the e-mail address found in storage. It is anticipated that in one preferred embodiment this report would be on a system internal to the customer's site. In decision block 13, if it is determined that there is no e-mail address in storage, then the logic flow proceeds to end job block 15. Likewise, in the above situation where an e-mail report in block 14 is sent, the routine similarly ends at end job block 15.

Figure 2:
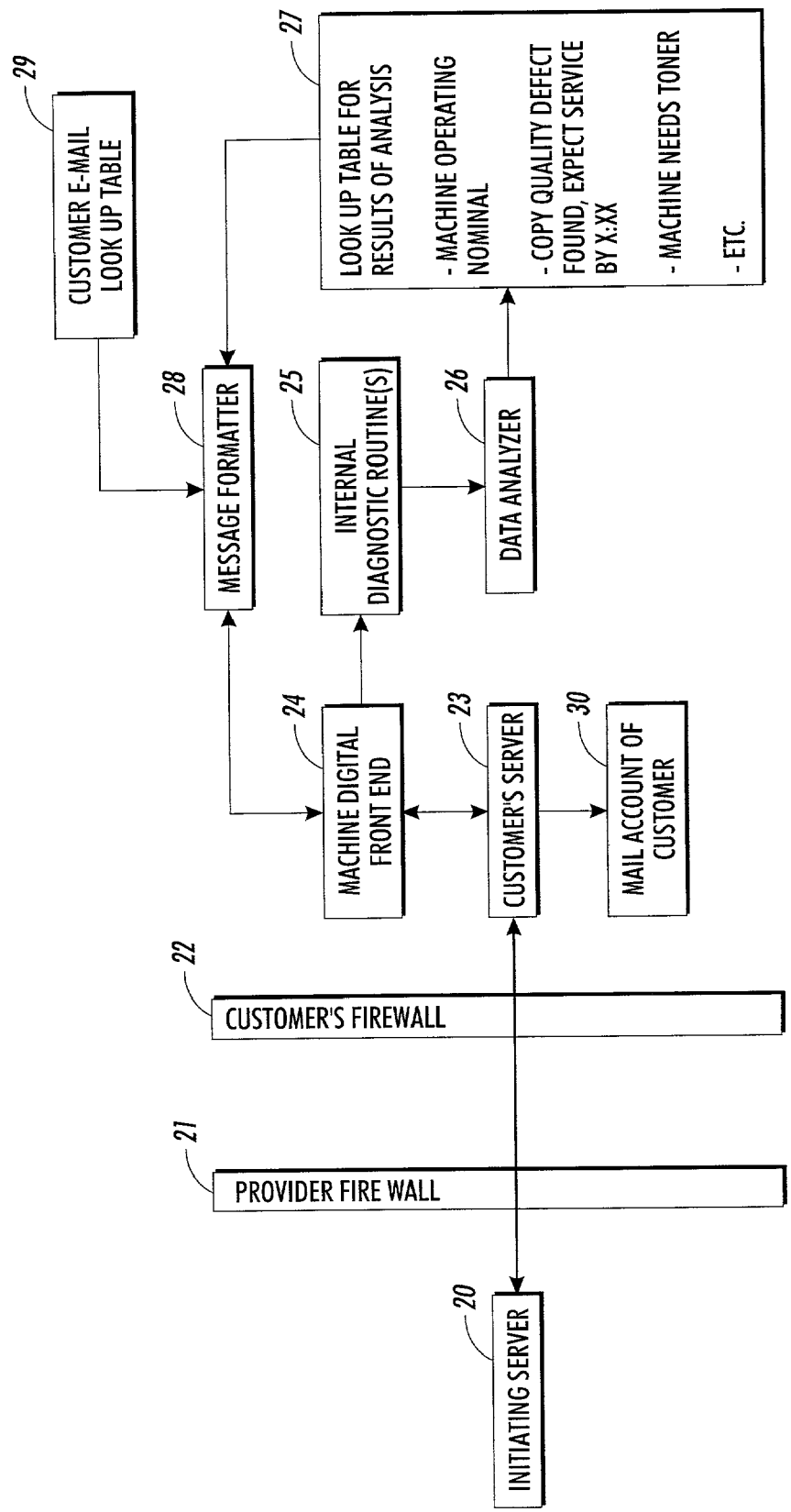
FIG. 2 shows a schematical description of a typical hardware embodiment across which the invention may operate.

In FIG. 2, we have a hardware implementation for the present invention. Initiating server 20 will communicate to the customer location, first by passing through provider firewall 21 and then through the customer firewall 22 and into customer server 23. This then gets channeled to the machine controller digital front end 24. In one embodiment, the system within which machine controller digital front end 24 is provided is a digital copier/printer. This communication from initiating server 20 may invoke a direct initiation of a diagnostic routine 25 or it may invoke the setting of a time clock such that the internal diagnostic routine 25 is initiated at another more appropriate appointed time, such as for example, after normal work hours. Examples of such diagnostics might include electrical current draws for various system motors or corona devices; or a color metric setup to confirm proper color space rendering on a color printer; or any other typical machine or system diagnostic as would be apparent to those skilled in the art. After the internal diagnostic routine 25 is run, the data generated from the routine is analyzed by the data analyzer 26. It does this in one embodiment by searching through lookup table 27 to determine by comparison if the findings are outside of normal operating range. Then a message formatter 28 takes this finding and assembles it with a customer e-mail address from lookup table 29 to generate a report. The report is sent via the machine controller front end 24 to customer server 23, and from there to the mail account of customer 30. It should be noted that many other forms of electronic communication could be utilized as will be apparent to those skilled in the art, for instance by direct hard wire, phone line or internet connection.

It is considered within the present invention that upon the initiation of a diagnostic routine 25 where a determination is made that the findings are indeed outside of normal operating range that a self alignment is then invoked. For example, in a color printer embodiment where a color metric diagnostic has been performed, the imaging machine may then be re-calibrated to provide better color print fidelity. Such techniques are well known in the art. For a discussion of one approach to the above, see U.S. Pat. No. 5,884,118, to Mestha et al., which is herein incorporated by reference in its entirety for its teaching. Other examples include, upon the determination that a xerographic setup diagnostic is unsuccessful then a change could be made in the toner concentration to optimize performance; or where there are multiple raster output scanners (ROS) in an imaging system upon diagnostic indication of color layer misregistration a ROS alignment may be performed.

This invocation of self alignment or self repair as well as its ultimate success or failure as determined by a repeated diagnostic 25 is then subsequently communicated to the customer via the above described e-mail or a subsequent e-mail notice. Similarly, an e-mail may be sent to notify the customer that the machine is within normal operating range, and that while no optimization was required never-the-less experience has shown the benefit of a machine diagnostic being performed. Such a machine optimization may utilize the same or similar diagnostic routines as for self alignment or self repair. A separate e-mail notice may be sent for each operation or a single report may be sent which captures an entire evenings worth of data results. This reporting may also be communicated back to the service provider, perhaps by email or internet connection or perhaps by a phone line.

In summary, by a constant communication and flagging to the customer of performed system diagnostics, alignments and optimizations, undesirable customer nervousness and fear of paying for something not received may be greatly ameliorated. Furthermore, there is the additional value to the customer of a system self generated record log of system status and condition, in addition to the more immediate feedback and satisfaction of knowing exactly where the system health and state of repair is presently.

While the embodiments disclosed herein are preferred, it will be appreciated from this teaching that various alternative, modifications, variations or improvements therein may be made by those skilled in the art, which are intended to be encompassed by the following claims:

The invention claimed is:

1. A method for after hours system diagnosis comprising:
  initiating a system self optimization;
  generating a status report of the system self optimization;
  initiating a system diagnostic to determine the success of the system self optimization;
  generating a status report of the results of the system diagnostic; and,
  sending the generated status report of the system self optimization and system diagnostic from the system.

2. The method for after hours system diagnosis of claim 1 wherein the status report of the system diagnostic is sent with the status report of the results of the system self optimization.

3. The method for after hours system diagnosis of claim 1 wherein the status report of the system diagnostic is sent subsequent to the status report of the results of the system self optimization.

4. The method for after hours system diagnosis of claim 1 wherein the status report of the system self optimization is sent subsequent to the status report of the results of the system diagnostic.

5. The method for after hours system diagnosis of claim 1 wherein the status report is sent from the system locally.

6. The method for after hours system diagnosis of claim 1 wherein the status report is sent from the system locally to an email address found within a lookup table in the system.

7. The method for after hours system diagnosis of claim 1 wherein the initiation of the system self optimization is evoked by an outside provider.

8. The method for after hours system diagnosis of claim 7 wherein the status report is sent from the system back to the outside provider.

9. A method for after hours system diagnosis comprising:
  initiating a system diagnostic remotely which yields results;
  generating a status report of the results of the system diagnostic;
  comparing the results to normal system operating range
  initiating a system self optimization if the results of the compare step so dictate;
  generating a status report of the self optimization; and,
  sending the generated status reports of the system diagnostic and self optimization from the system.

10. The method for after hours system diagnosis of claim 9 wherein the status report of the self optimization is sent with the status report of the results of the system diagnostic.

11. The method for after hours system diagnosis of claim 9 wherein the status report of the self optimization is sent subsequent to the status report of the results of the system diagnostic.

12. The method for after hours system diagnosis of claim 9 wherein the initiation of the system diagnostic is evoked by an outside provider.

13. The method for after hours system diagnosis of claim 12 wherein the status report is sent from the system back to the outside provider.

14. A method for after hours system diagnosis comprising:
   initiating an after hours system diagnostic remotely;
   comparing system diagnostic results to a normal operating range;
   initiating a system self optimization if the results of the compare step so dictate;
   initiating a second system diagnostic to determine the success of the self optimization;
   generating a status report of the results of the system diagnostic, the initiation of any self optimization and the result of any second system diagnostic; and,
   sending the generated status report from the system.

15. The method of claim 14 wherein the normal operating range for comparison is provided as entries in a look-up table.

16. The method for after hours system diagnosis of claim 14 wherein the status report is sent from the system locally to an email address found within a lookup table in the system.

17. The method for after hours system diagnosis of claim 14 wherein the initiation of the system diagnostic is evoked by an outside provider.

18. The method for after hours system diagnosis of claim 17 wherein the status report is sent from the system back to the outside provider.

19. The method of claim 14 wherein the system is a copier/printer.

20. The method of claim 19 wherein the diagnostic is a color metric setup.

21. The method of claim 19 wherein the optimization is a raster output scanner alignment.

22. The method of claim 19 wherein the optimization is a change in toner concentration.

* * * * *